United States Patent
Bogineni et al.

(10) Patent No.: US 10,740,149 B2
(45) Date of Patent: Aug. 11, 2020

(54) SERVERLESS COMPUTING ARCHITECTURE

(71) Applicant: Verizon Patent and Licensing Inc., Arlington, VA (US)

(72) Inventors: Kalyani Bogineni, Hillsborough, NJ (US); Ratul Kumar Guha, Kendall Park, NJ (US); Hans Raj Nahata, New Providence, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 202 days.

(21) Appl. No.: 15/958,412

(22) Filed: Apr. 20, 2018

(65) Prior Publication Data

US 2019/0324813 A1 Oct. 24, 2019

(51) Int. Cl.
*H04W 4/70* (2018.01)
*G06F 9/50* (2006.01)
*G06F 9/54* (2006.01)
*H04L 29/08* (2006.01)

(52) U.S. Cl.
CPC .......... *G06F 9/5022* (2013.01); *G06F 9/5077* (2013.01); *G06F 9/546* (2013.01); *H04L 69/329* (2013.01); *H04W 4/70* (2018.02)

(58) Field of Classification Search
CPC ...... G06F 9/5022; G06F 9/5077; G06F 9/546; H04W 4/70; H04L 69/329
See application file for complete search history.

(56) References Cited

U.S. PATENT DOCUMENTS

| | | | |
|---|---|---|---|
| 2011/0239120 A1* | 9/2011 | Krishnakumar | H04L 63/0428 715/733 |
| 2012/0102183 A1* | 4/2012 | Murakami | G06F 9/5027 709/224 |
| 2017/0079059 A1* | 3/2017 | Li | H04W 16/02 |
| 2019/0037409 A1* | 1/2019 | Wang | H04W 48/18 |

* cited by examiner

*Primary Examiner* — Rina C Pancholi

(57) ABSTRACT

A computing device may include a memory configured to store instructions and a processor configured to execute the instructions to initialize a Fifth Generation wireless system (5G) function node of a particular type; identify one or more always-on processes associated with the particular type of 5G function node; and activate the identified one or more always-on processes. The processor may be further configured to monitor one or more trigger conditions associated with the 5G function node; detect a trigger condition, of the one or more trigger conditions; identify an on-demand process associated with the 5G function node based on the detected trigger condition; and activate the identified on-demand process in a serverless computing system using a serverless computing interface, in response to detecting the trigger condition.

20 Claims, 9 Drawing Sheets

SERVERLESS COMPUTING ARCHITECTURE

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices. In order to maintain service quality across a network, the provider may need to configure a large number of network components to make efficient use of resources.

DETAILED DESCRIPTION OF PREFERRED EMBODIMENTS

Figure 1:
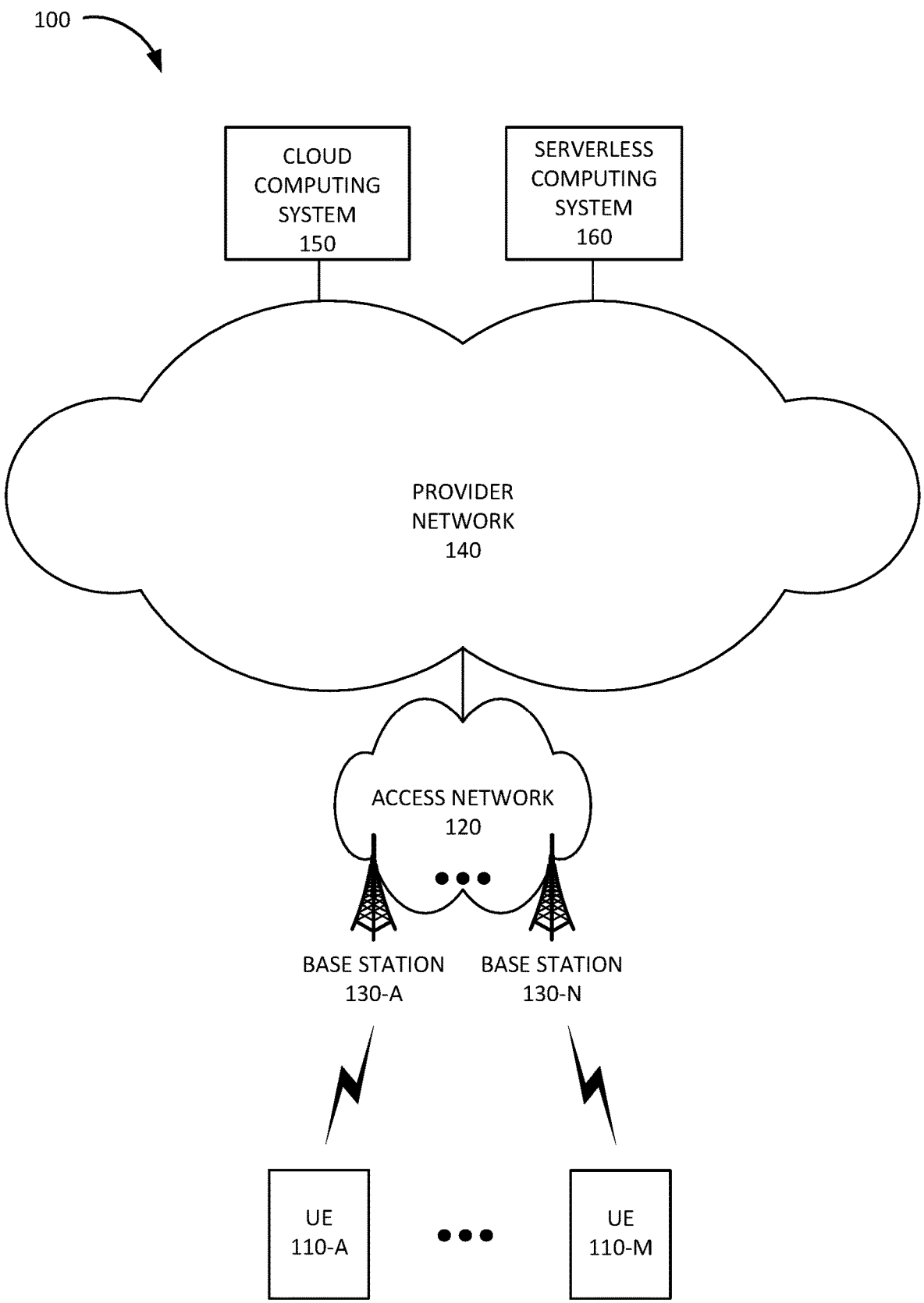
FIG. 1 is a diagram illustrating an environment according to an implementation described herein.

The following detailed description refers to the accompanying drawings. The same reference numbers in different drawings identify the same or similar elements.

As the data traffic and number of user equipment (UE) devices using wireless access networks increase, the number of different types of UE devices and the number of different types of data also increase. For example, an exponential growth in Internet of Things (IoT) applications leads to an increasing number of different types of UE devices employing machine-to-machine (M2M) communication, such as Machine-Type Communication (MTC). The growing number of MTC devices is one of the motivations behind the development of $5^{th}$ generation wireless systems (5G). The capacity and functionality to connect a large number of MTC sensors and/or actuators may be referred to as massive MTC (mMTC).

Other use cases of 5G may include massive broadband (xMBB) configured to enable delivery of gigabytes of bandwidth for applications such as high density video streaming; ultra-reliable MTC (uMTC) (e.g., Ultra-Reliable Low-Latency Communications (uRLLC), etc.) for applications such as health monitoring, remote surgery, self-driving vehicles, drone control, industrial automation, and/or other types of applications; and/or other types of use cases.

A 5G network includes function nodes to establish and maintain wireless connections from user equipment (UE) devices to other networks, such as the Internet, a public Internet Protocol (IP) network, a private IP network, the Public Switched Telephone Network (PSTN), and/or other types of networks. As an example, a 5G network may separate control plane traffic from user plane traffic using a Session Management Function (SMF) node and a User Plane Function (UPF) node, respectively. As another example, registration, reachability, connection, and/or mobility management may be performed using an Access and Mobility Function (AMF) node.

A provider may employ different techniques and strategies to manage a 5G network. One strategy may include the use of virtualized network functions (VNFs) rather than dedicated hardware to implement particular function nodes. VNF representations of network devices and/or nodes may be implemented using, for example, a European Telecommunications Standards Institute (ETSI) network function virtualization (NFV) management and organization (MANO) architecture and may be referred to as VNF managed objects (VNF MOs). VNF MOs may be deployed, for example, on hardware in a cloud computing center. In contrast to specialized hardware, which may be costly, time-consuming to deploy, difficult to scale, and/or labor-intensive to manage, NFV may enable network entities to be implemented on standardized hardware, resulting in lower deployment and/or maintenance costs, as well as higher flexibility compared to dedicated hardware implementations.

However, NFV may also present challenges. For example, VNFs may be provided and/or hosted by third-party developers and may be associated with a high operating cost. Furthermore, a function node may be available as a VNF that is deployed or not deployed and a deployed VNF for the function node may be running and consuming significant resources even when the function node is not required to be active for the functioning of a 5G network. Thus, running VNFs for function nodes may be inefficient.

Implementations described herein relate to a serverless computing 5G architecture. "Serverless computing," as the phrase is used herein, refers to cloud computing with dynamic allocation of computing resources. Thus, rather than allocating predetermined units of capacity (e.g., amount of memory or persistent storage, processor time, number of processor cores, network bandwidth, etc.), serverless computing allocates resources as needed when a particular process is executed. A serverless computing process may be activated by a trigger event. In response to the trigger event, code associated with the process may be loaded and executed. After the process is executed, computing resources required to load and execute the process may be released. Since serverless computing does not require computing infrastructure to manage, processes to be executed using serverless computing may be self-scaling.

While serverless computing may be more efficient for many processes, serverless computing may not be appropriate for some processes. For example, because loading and executing code takes time, serverless computing may not be appropriate for processes that have a low latency requirement. Thus, for a particular 5G function node, some processes associated with the particular 5G function node may be selected to be implemented using serverless computing and other processes associated with the particular 5G node may be implemented without using serverless computing. The processes performed by the particular 5G node may thus be divided into processes to be performed using serverless computing, and referred to herein as "on-demand processes," and processes to be implemented using dedicated resources (e.g., dedicated cloud computing resources and/or hardware components), and referred herein as "always-on" processes. Distinguishing between on-demand processes and always-on processes for a 5G function node may conserve network resources while maintaining network efficiency, by, for example, reducing processor, memory, and/or network bandwidth loads while satisfying service requirements, such as a latency requirement.

A computer device may be configured select a process associated with the particular type of 5G function node; determine that the selected process is to be an on-demand process based on one or more criteria; generate code for the selected process based on determining that the selected process is to be an on-demand process; and provide the generated code to the serverless computing system. The one or more criteria may include, for example, a latency requirement associated with the selected process, a resource requirement associated with the selected process, a trigger frequency associated with the selected process, a process dependency associated with the selected process, and/or other types of criteria.

The computer device may further be configured to initialize a 5G function node of the particular type; identify one or more always-on processes associated with the particular type of 5G function node; activate the identified one or more always-on processes; monitor one or more trigger conditions associated with the 5G function node; detect a trigger condition, of the one or more trigger conditions; identify an on-demand process associated with the 5G function node based on the detected trigger condition; and activate the identified on-demand process in a serverless computing system using a serverless computing interface, in response to detecting the trigger condition. Additionally, the computer device may maintain a request queue and a state for the 5G function node.

The trigger condition may include, for example, receiving a request from a UE device, receiving a request from another 5G function node, receiving a request from an on-demand process associated with the 5G function mode or the other 5G function node, detecting a particular network state associated with the on-demand process, detecting a particular time period associated with the on-demand process, and/or another type of trigger condition.

The 5G function node may include, for example, a gNodeB node, an AMF node, a Unified Data Management (UDM) node, an SMF node, a UPF node, an Application Function (AF) node, a Policy Control Function (PCF) node, a Network Exposure Function (NEF) node, a Network Repository Function (NRF) node, a Network Slice Selection Function (NSSF) node, and/or another type of 5G function node.

The identified on-demand process may include, for example, a UE device registration process, an Internet Protocol (IP) Multimedia Subsystem (IMS) registration process, a UE device authentication process, a UE device group management process, a charging process, an IP address allocation process, a packet filtering configuration process, a Quality of Service (QoS) mapping process, a session management process, a network slice management process, and/or another type of process associated with the 5G function node that satisfies one or more criteria for being designated as an on-demand process implemented via serverless computing.

Identifying the one or more always-on processes may include determining that a particular process, associated with the particular type of 5G function node, is associated with a latency requirement that is lower than a latency threshold and designating the particular process as an always-on process based on determining that the particular process is associated with the latency requirement that is lower than the latency threshold.

The computer device may be further configured to receive a request to change a particular on-demand process, associated with the particular type of 5G function node, to an always-on process; designate the particular on-demand process as an always-on process, in response to receiving the request; and activate the particular on-demand process as an always-on process. Moreover, the computer device may be further configured to receive a request to change a particular always-on process, associated with the particular type of 5G function node, to an on-demand process; designate the particular always-on process as an on-demand process, in response to receiving the request; generate on-demand code for the designating on-demand process; provide the generated on-demand code to the serverless computing system; select an on-demand trigger condition for the designated on-demand process; and monitor for the selected on-demand trigger condition.

While implementations described herein relate to 5G function nodes, other implementations may relate to different types of function nodes. For example, the function nodes may include Fourth Generation (4G) function nodes, such as Long Term Evolution (LTE) function nodes; fixed wireless function nodes; function nodes for network not associated with standards maintained by the Third Generation Partnership Project (3GPP), such as WiFi function nodes, WiMAX function nodes, etc.; and/or other types of function nodes for an access network. Furthermore, in yet other implementations, the function nodes may include network management function nodes, such as Fault, Configuration, Accounting, Performance, and Security (FCAPS) function nodes. For example, a charging or billing function node that interfaces with a 5G SMF function node or PCF function node may be designated as including one or more always-on processes and one or more on-demand processes implemented via serverless computing.

FIG. 1 is a diagram of an exemplary environment 100 in which the systems and/or methods, described herein, may be implemented. As shown in FIG. 1, environment 100 may include UE devices 110-A to 110-M, an access network 120, a provider network 140, a cloud computing system 150, and a serverless computing system 160.

UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, premium Internet access etc.), best effort data traffic, and/or other types of applications.

In other implementations, UE device 110 may correspond to a wireless MTC device that communicates wirelessly with other devices over a machine-to-machine (M2M) interface. For example, UE device 110 may be electrically coupled to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In yet other implementations, UE device 110 may correspond to a mobile MTC device, such as an unmanned ground or aerial vehicle or system that communicates wirelessly with other devices over an MTC or another type of M2M communication interface. Examples of such mobile MTC devices include self-driving vehicles; consumer drone devices used for entertainment, photo or video capture, payload delivery, and/or other uses; commercial delivery drones used to deliver packages to customers; law enforcement drones used for intelligence gathering operations; and/or other types of unmanned vehicles, drones, aerostats, or other aerial devices.

Access network 120 may provide access to provider network 140 for wireless devices, such as UE device 110. Access network 120 may enable UE device 110 to connect to provider network 140 for mobile telephone service, Short Message Service (SMS) message service, Multimedia Message Service (MMS) message service, Internet access, non-IP data delivery, cloud computing, and/or other types of data services. Access network 120 may include base stations 130-A to 130-N and UE devices 110-A to 110-M may wirelessly communicate with access network 120 via base station 130.

Base station 130 may include an eNodeB and/or gNodeB base station device that includes one or more devices (e.g., wireless transceivers) and other components and functionality that allow UE device 110 to wirelessly connect to access network 120. Base station 130 may correspond to a macrocell or to a small cell (e.g., a femtocell, a picocell, a microcell, etc.). Base station 130 may include or be associated with one or more slices (also referred to as "sectors" or "cells"). For example, each slice may include a radio frequency (RF) transceiver facing a particular direction. Each slice of base station 130 may include a MIMO antenna array configured to operate in an mm-wave band, such as AWS, PCS, and/or another high frequency LTE band.

Access network 120 may establish a packet data network connection between UE device 110 and provider network 140 via one or more Access Point Names (APNs). For example, wireless access network 130 may establish an Internet Protocol (IP) connection between UE device 110 and core network 140. Furthermore, access network 120 may enable a server device to exchange data with UE device 110 using a non-IP data delivery method such as Data over Non-Access Stratum (DoNAS).

Access network 120 may include a 5G, and/or an LTE Advanced (LTE-A) access network or other advanced network, that includes functionality such as a mm-wave Radio Access Network (RAN); advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Furthermore, in some implementations, access network 120 may additionally include an LTE access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Provider network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Core network 140 may allow the delivery of Internet Protocol (IP) services to UE device 110, and may interface with other external networks, such as private IP networks. Provider network 140 may include one or more server devices and/or network devices, or other types of computation or communication devices. In some implementations, core network 140 may include an Internet Protocol Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

Cloud computing system 150 may include one or more devices, such as server devices, farms, clusters, and/or other types of computer devices, which provide cloud computing services for provider network 140 and/or access network 120. The cloud computing services may include, for example, computing as a service, cloud storage, a hosted voice-over-Internet Protocol (VoIP) service, a Network Address Translation (NAT) service, a Virtual Private Network (VPN) service, a Distributed Denial Of Service (DDOS) detection and/or mitigation service, a firewall service, an Intrusion Detection and Prevention System (IDPS), an email filtering service, a filtering service for a particular web site, a load balancing service, a video distribution service, a lawful intercept service on behalf of a law enforcement entity, and/or any other type of service that may be provided by a cloud center. Cloud computing system 150 may host VNF MOs, and some or all of the associated VFN architecture associated with the VNF MOs, for access network 120 and/or provider network 140.

Serverless computing system 160 may include one or more devices, such as server devices, farms, clusters, and/or other types of computer devices, which provide serverless computing services for provider network 140 and/or access network 120. For example, serverless computing system 160 may store code for a particular on-demand process associated with a function node in access network 120 and/or provider network 140. The on-demand process may be activated when a trigger condition is detected and a trigger condition message is sent to serverless computing system 160 using an interface, such as an Application Programming Interface (API), associated with serverless computing system 160. In response, serverless computing system 160 may load code associated with the on-demand process and may execute the code based on input parameters received via the interface. After the on-demand process is executed, serverless computing system 160 may release resources used for loading and executing the on-demand process.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
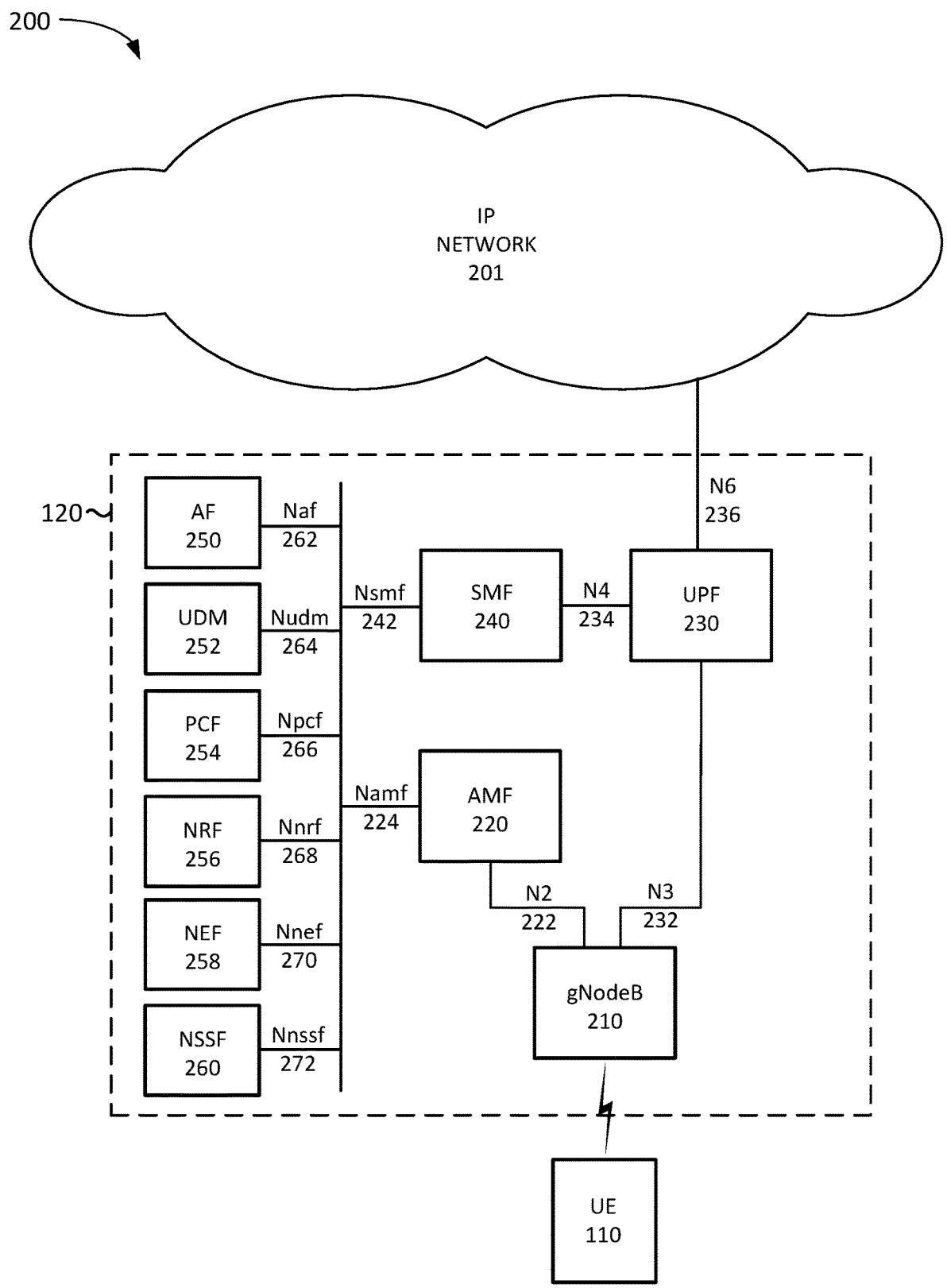
FIG. 2 is a diagram illustrating exemplary components of the access network of FIG. 1.

FIG. 2 is a diagram illustrating a system 200 that includes exemplary components of access network 120 in the context of environment 100 according to an implementation described herein. As shown in FIG. 2, system 200 may include UE device 110, access network 120, and an IP network 201. IP network 201 may correspond to, or be included in, provider network 140.

Access network 120 may include a gNodeB 210 (corresponding to base station 130), an AMF 220, a UPF 230, an SMF 240, an AF 250, a UDM 252, a PCF 254, an NRF 256, an NEF 258, and an NSSF 260. While FIG. 2 depicts a single gNodeB 210, AMF 220, UPF 230, SMF 240, AF 250, UDM 252, PCF 254, NRF 256, NEF 258, and NSSF 260 for illustration purposes, in practice, FIG. 2 may include multiple gNodeBs 210, AMFs 220, UPFs 230, SMFs 240, AFs 250, UDMs 252, PCFs 254, NRFs 256, NEFs 258, and/or NSSFs 260.

gNodeB 210 may include one or more devices (e.g., base stations) and other components and functionality that enable UE device 110 to wirelessly connect to access network 120 using 5G Radio Access Technology (RAT). For example, gNodeB 210 may include one or more cells, with each cell including a wireless transceiver with an antenna array configured for mm-wave wireless communication. gNodeB 210 may communicate with AMF 220 using an N2 interface 222 and communicate with UPF using an N3 interface 232.

AMF 220 may perform registration management, connection management, reachability management, mobility management, lawful intercepts, Short Message Service (SMS) transport between UE device 110 and an SMS function (not shown in FIG. 2), session management messages transport between UE device 110 and SMF 240, access authentication and authorization, location services management, functionality to support non-3GPP access networks, and/or other types of management processes. AMF 220 may be accessible by other function nodes via an Namf interface 224.

UPF 230 may maintain an anchor point for intra/inter-RAT mobility, maintain an external Packet Data Unit (PDU) point of interconnect to a data network (e.g., IP network 201, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a Radio Access Network (RAN) node (e.g., gNodeB 210), and/or perform other types of user plane processes. UPF 230 may communicate with SMF 240 using an N4 interface 234 and connect to IP network 201 using an N6 interface 236.

SMF 240 may perform session establishment, modification, and/or release, perform IP address allocation and management, perform Dynamic Host Configuration Protocol (DHCP) functions, perform selection and control of UPF 230, configure traffic steering at UPF 230 to guide traffic to the correct destination, terminate interfaces toward PCF 254, perform lawful intercepts, charge data collection, support charging interfaces, control and coordinate of charging data collection, termination of session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 266.

NRF 256 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 256 may be accessible via an Nnrf interface 268.

NEF 258 may expose capabilities and events to other NFs, including $3^{rd}$ party NFs, AFs, edge computing NFs, and/or other types of NFs. Furthermore, NEF 258 may secure provision of information from external applications to access network 120, translate information between access network 120 and devices/networks external to access network 120, support a Packet Flow Description (PFD) function, and/or perform other types network exposure functions. NEF 258 may be accessible via Nnef interface 270.

NSSF 260 may select a set of network slice instances to serve a particular UE device 110, determine network slice selection assistance information (NSSAI), determine a particular AMF 220 to serve a particular UE device 110, and/or perform other types of processes associated with network slice selection or management. NSSF 260 may be accessible via Nnssf interface 272.

Although FIG. 2 shows exemplary components of access network 120, in other implementations, access network 120 may include fewer components, different components, differently arranged components, or additional components than depicted in FIG. 2. Additionally or alternatively, one or more components of access network 120 may perform functions described as being performed by one or more other components of access network 120. For example, access network 120 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 2, additionally or alternatively, access network 120 may include a reference point architecture that includes point-to-point interfaces between particular function nodes.

Figure 3:
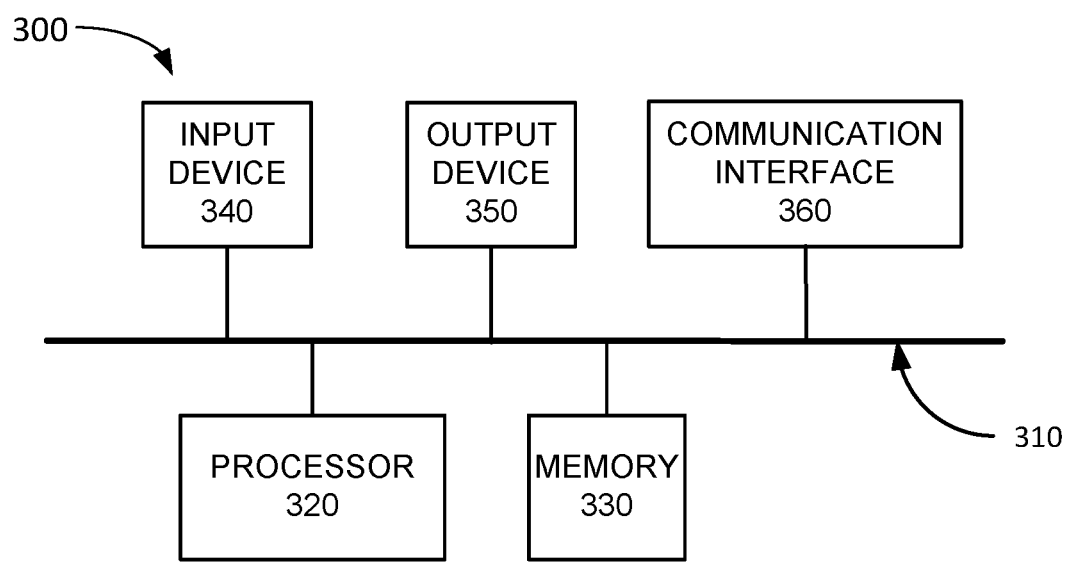
FIG. 3 is a diagram illustrating exemplary components of a device that may be included in a device of FIG. 1 and/or FIG. 2.

FIG. 3 is a diagram illustrating example components of a device 300 according to an implementation described herein. UE device 110, gNodeB 210, AMF 220, UPF 230, SMF 240, AF 250, UDM 252, PCF 254, NRF 256, NEF 258, NSSF 260, other components of access network 120, cloud computing system 150, and/or serverless computing system 160 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to the implementation of a serverless computing architecture for a 5G network. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
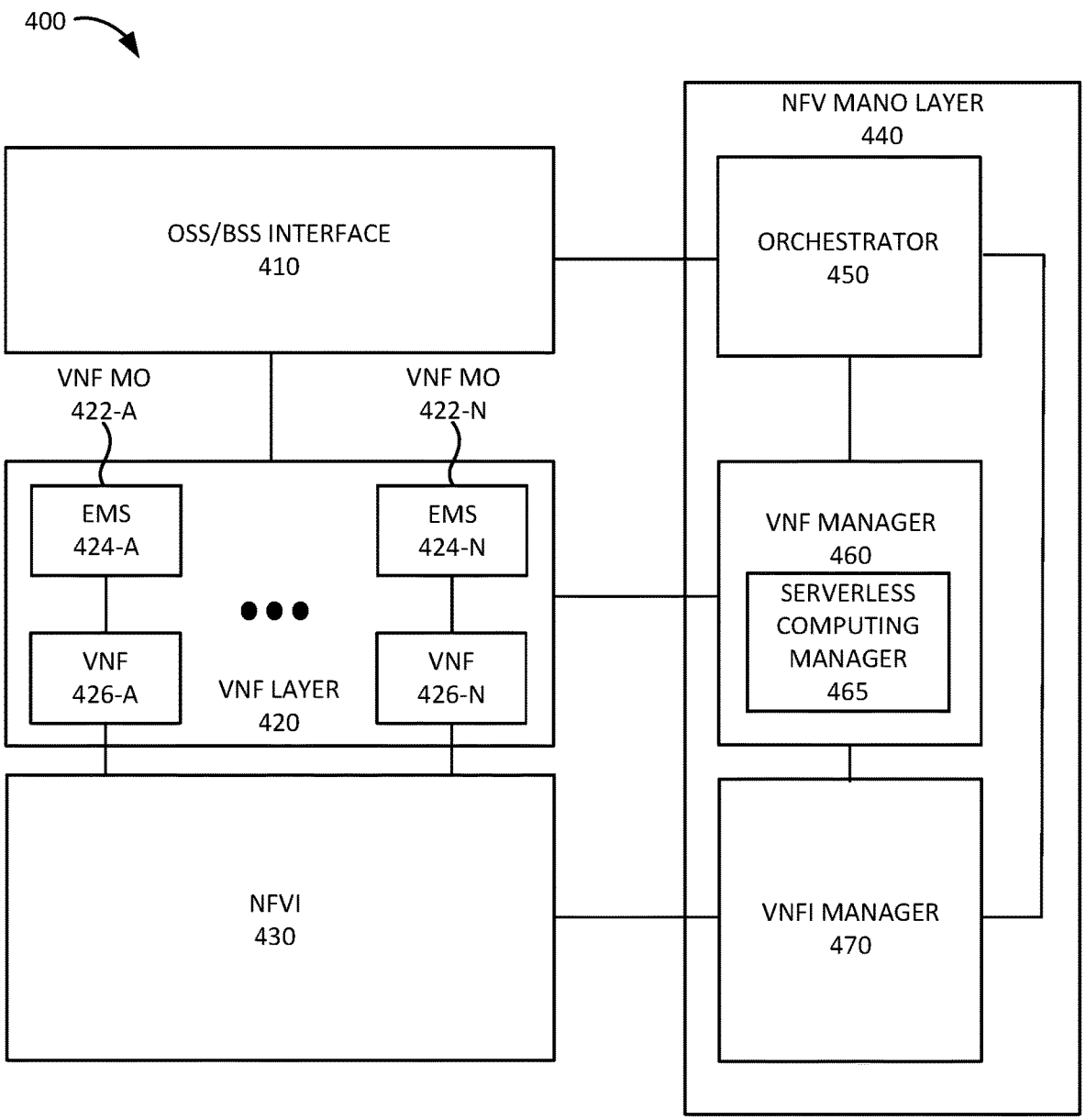
FIG. 4 is a diagram illustrating exemplary functional components of a virtualized network function architecture that may be used to implement one or more components of the access network of FIG. 2.

FIG. 4 is a diagram illustrating exemplary functional components of an NFV architecture system 400. The functional components of NFV architecture system 400 may be implemented, for example, via processor 320 executing instructions from memory 330 on one or more devices 300 included in cloud computing system 150. Alternatively, some or all of the functional components included in NFV architecture system 400 may be implemented via hard-wired circuitry. As shown in FIG. 4, NFV architecture system 400 may include an operations support system/business support system (OSS/BSS) interface 410, a VNF layer 420, an NFV Infrastructure (NFVI) 430, and an NFV MANO layer 440.

OSS/BSS interface 410 may interface with OSS systems, such as a network monitoring system, a network provisioning system, a network management system, a testing system, and/or other types of OSS systems. Furthermore, OSS/BSS interface 410 may interface with BSS systems, such as an ordering system, a customer service system, and/or a billing system. OSS/BSS interface 410 may enable the OSS and BSS systems to manage the virtualized components of access network 120 and/or provider network 140. Furthermore, OSS/BSS 410 may interface with a Self-Organizing and/or Self-Optimizing Network (SON) system to perform planning, configuration, management, optimization, and/or healing of access network 120 and/or provider network 140.

VNF layer 420 may include VNF MOs 422-A to 422-N. Each VNF MO 422 may correspond to an instance of a VNF MO of a particular type. For example, VNF MO 422 may include an Element Management System (EMS 424) and a VNF 426. EMS 424 may manage VNF MO 422 and VNF 426 may include the implementation of network functions performed by the VNF MO 422. For example, if NFV architecture system 400 is used for access network 120, a first VNF MO 422 may correspond to a virtualized gNodeB 210, a second VNF MO may correspond to a virtualized AMF 220, a third VNF MO may correspond to a virtualized UPF 230, a fourth VNF MO may correspond to a virtualized SMF 240, a fifth VNF MO may correspond to a virtualized UDM 252, etc.

NVFI 430 may include hardware (e.g., processors, memory, storage components, networking components, etc.) and software components on which VNF MOs 422 are deployed. For example, NVFI 430 may include the hardware and software components included in cloud computing system 150. NFV MANO layer 440 may corresponds to an ETS NFV MANO architecture. NFV MANO layer 440 may include an orchestrator 450, a VNF manager 460, and a VNFI manager 470. Orchestrator 450 may perform orchestration of NFV to ensure that sufficient resources are available to provide a network service and that a particular network function is deployed, changed, or removed. Thus, orchestrator 450 may coordinate requests received via OSS/BSS interface 410 with VNF manager 460 and VNFI manager 470.

VNF manager 460 may manage VNF MOs 422. VNF manager 460 may perform lifecycle management of particular VNF MOs 422, including instantiation, scaling, updating, and/or termination of particular VNF MOs 422 based on instructions received from orchestrator 450. VNF manager 460 may include a serverless computing manager 465. Serverless computing manager 465 may manage serverless computing for VNF MOs 422. For example, for a particular type of function node, serverless computing manager 465 may determine which processes executed by the particular type of function node are to be always-on processes and which processes executed by the particular type of function node are to be on-demand processes to be loaded and executed on demand by serverless computing system 160. When a new VNF MO 422 for the particular type of function node is instantiated, serverless computing manager 465 may select the on-demand processes for the new VNF MO 422, may select trigger conditions for the selected on-demand processes, and may instruct the new VNF MO 422 to monitor for the selected trigger conditions.

Although FIG. 4 shows exemplary components of NFV architecture system 400, in other implementations, NFV architecture system 400 may include fewer components, different components, additional components, or differently arranged components than depicted in FIG. 4. Additionally or alternatively, one or more components of NFV architecture system 400 may perform one or more tasks described as being performed by one or more other components of NFV architecture system 400.

For example, while in some implementations, some or all of NFV architecture system 400 may be implemented in cloud computing system 150, in other implementations some or all of NFV architecture system 400 may be implemented in other devices, such as, for example, computer devices in access network 120. Furthermore, in some implementations, while some 5G network nodes may be virtualized, other 5G network nodes may be implemented using dedicated hardware. For example, a 5G node may include dedicated hardware configured to implement one or more always-on processes and to activate one or more on-demand processes in serverless computing system 160 via a serverless computing system interface.

Figure 5A:
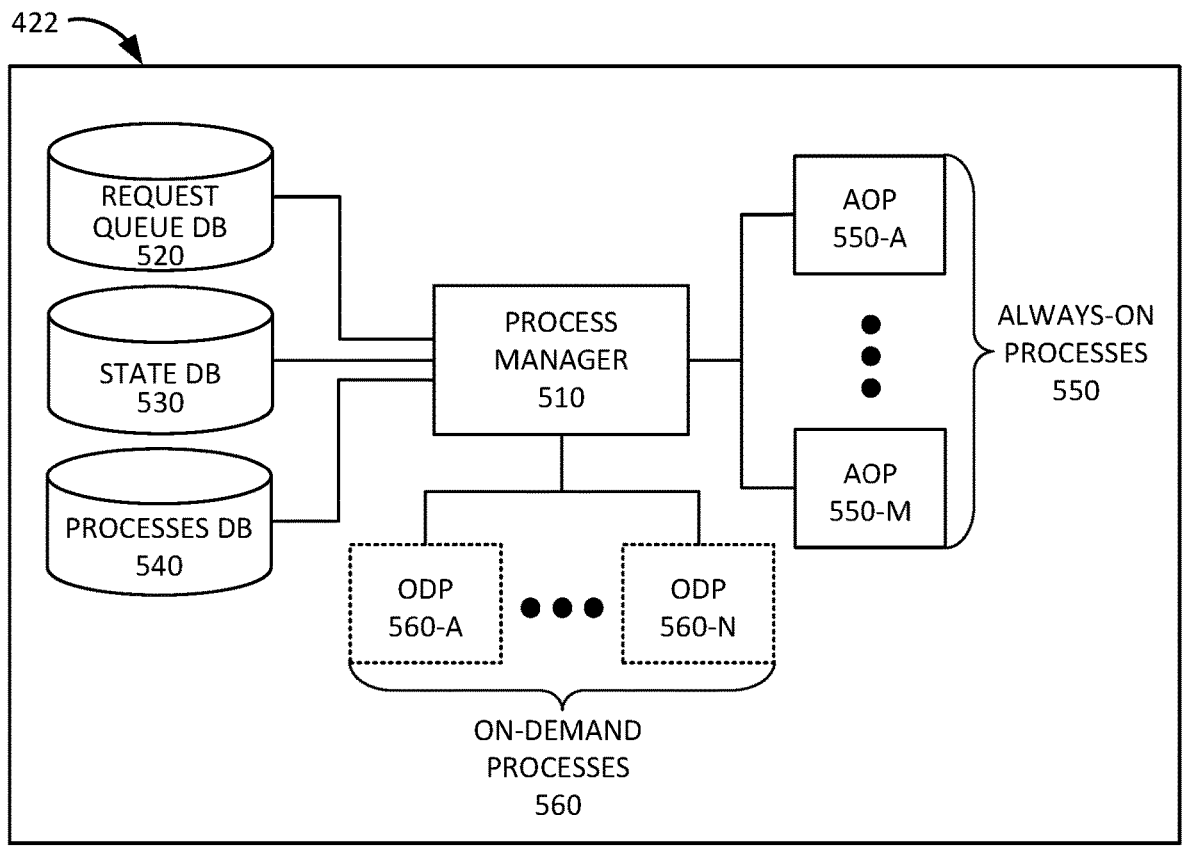
FIG. 5A is a diagram illustrating exemplary functional components of a function node of the access network of FIG. 2.

FIG. 5A is a diagram illustrating exemplary functional components of VNF MO 422. The functional components of VNF MO 422 may be implemented, for example, via processor 320 executing instructions from memory 330. Alternatively, some or all of the functional components included in VNF MO 422 may be implemented via hard-wired circuitry. As shown in FIG. 5A, VNF MO 422 may include a process manager 510, a request queue database (DB) 520, a state DB 530, a processes DB 540, a set of always-on processes (AOPs) 550-A to 550-M, and a set of on-demand processes (ODPs) 560-A to 560-N.

Process manager 510 may manage processes associated with VNF MO 422. For example, process manager 510 may activate and/or manage AOPs 550 after VNF MO 422 is instantiated. Furthermore, process manager 510 may manage ODPs 560 as described below with reference to FIG. 5B. Request queue DB 520 may store requests received by VNF MO 422. Requests received by VNF MO 422 and stored in DB 520 may be processed in the order they are received and/or based on a priority value assigned to each request and based information stored in state DB 530. State DB 530 may store a current state for VNF MO 422, such as, for example, requests being processes, responses on which VNF MO 422 is waiting, ODPs 560 that are running, a current capacity of VNF MO 422 to process requests, and/or other types of state information associated with VNF MO 422.

Process manager 510 may identify a particular AOP 550 or a particular ODP 560 associated with each request based on information stored in processes DB 540. Exemplary information that may be stored in processes DB 540 is described below with reference to FIG. 6A. If the request is associated with a particular AOP 550, process manager 510 may provide the request to the particular AOP 550. If the request is associated with a particular ODP 560, process manager 510 may activate the particular ODP 560 to process the request. ODPs 560 are shown as dashed lines to indicate that ODPs 560 are not running unless activated.

Figure 5B:
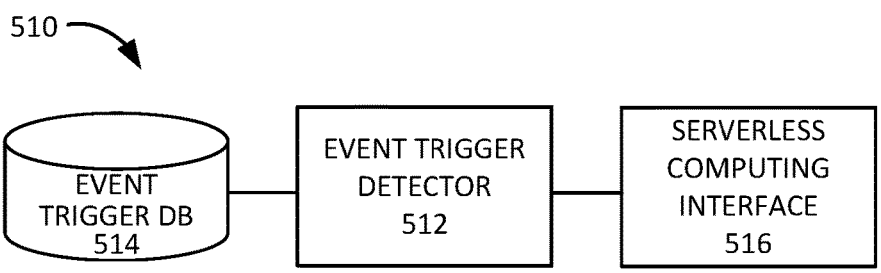
FIG. 5B is a diagram illustrating exemplary functional components of the process manager of FIG. 5A.

FIG. 5B is a diagram illustrating exemplary functional components of process manager 510. As shown in FIG. 5B, process manager 510 may include an event trigger detector 512, an event trigger DB 514, and a serverless computing interface 516.

Event trigger detector 512 may monitor request queue DB 520 for requests that may correspond to a trigger condition associated with an on-demand process in event trigger DB 514 and/or may monitor state DB 530 for states that correspond to a trigger condition associated with an on-demand process in event trigger DB 514. For example, trigger detector 512 may monitor for a particular request from UE device 110, a particular request from another 5G function node, a particular request from an on-demand process associated with VNF MO 422 or another 5G function node, a particular network state associated with the on-demand process, a particular time period associated the on-demand process, and/or another type of trigger condition. Exemplary information that may be stored in event trigger DB 514 is described below with reference to FIG. 6B.

In response to detecting a trigger condition associated with a particular on-demand process, trigger detector 512 may activate the particular on-demand process via serverless computing interface 516. Serverless computing interface 516 may send a request to serverless computing system 160 to load and execute code associated with the particular on-demand process based on the detected request and/or state associated with VNF MO 422. For example, serverless computing interface 516 may send the request via an API associated with serverless computing system 160.

Although FIGS. 5A and 5B show exemplary components of VNF MO 422, in other implementations, VNF MO 422 may include fewer components, different components, additional components, or differently arranged components than depicted in FIGS. 5A and 5B. Additionally or alternatively, one or more components of VNF MO 422 may perform one or more tasks described as being performed by one or more other components of VNF MO 422.

Figure 6A:
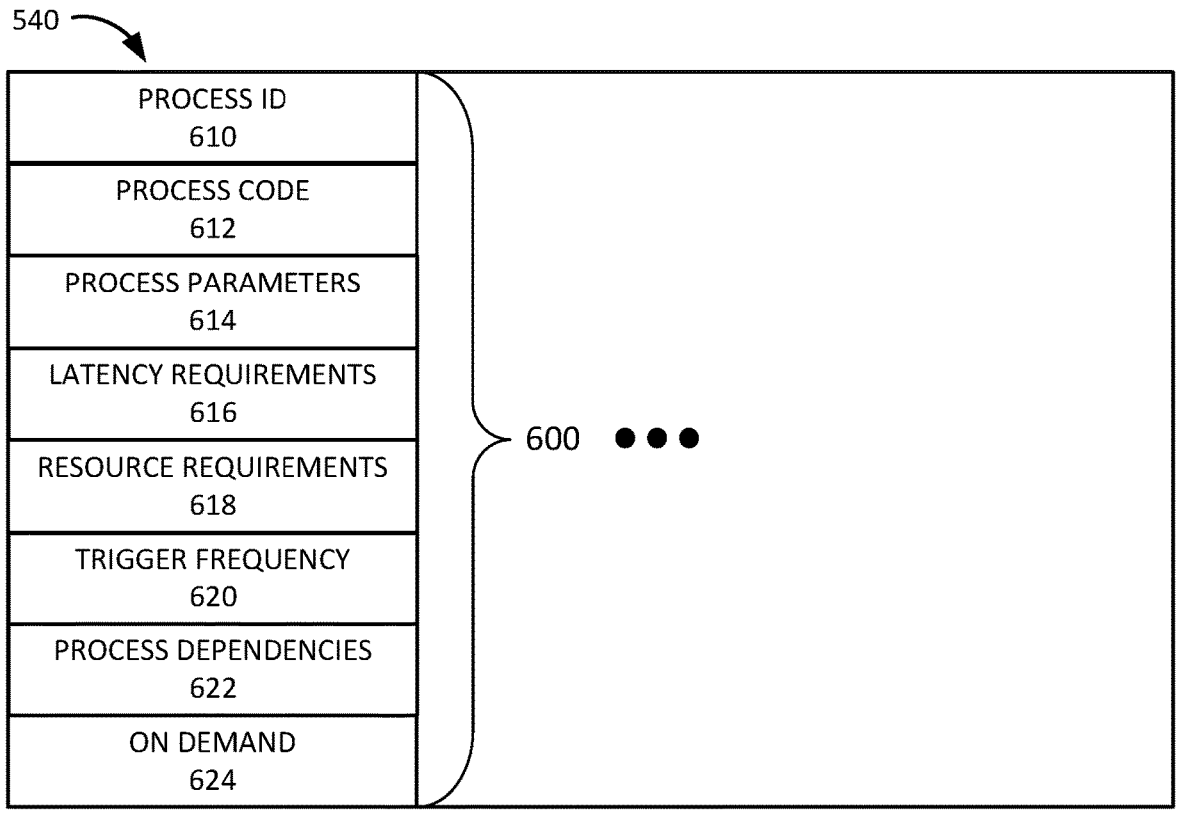
FIG. 6A is a diagram illustrating exemplary components of the processes database of FIG. 5A.

FIG. 6A is a diagram illustrating exemplary components of processes DB 540. As shown in FIG. 6A, processes DB 540 may include one or more process records 600. Each process record 600 may store information relating to a particular process performed by the function node associated with VNF MO 422. Process record 600 may include a process identifier (ID) field 610, a process code field 612, a process parameters field 614, a latency requirements field 616, a resource requirements field 618, a trigger frequency field 620, a process dependencies field 622, and an on-demand field 624.

Process ID field 610 may include a unique ID associated with a particular process associated with the 5G function node implemented via VNF MO 422. Process code field 612 may store code to implement the particular process. The code may be provided to and/or stored by serverless computing system 160 to load and execute when the particular process is activated as an on-demand process. Process parameters field 614 may include information identifying one or more parameters associated with the particular process. For example, process parameters field 614 may identify one or more input parameters to be used in activating the particular process using the API associated with serverless computing system 160.

Latency requirement field 616 may store information identifying a latency requirement associated with the particular process. Resource requirement field 618 may store information identifying a resource requirement associated with the particular process. Trigger frequency field 620 may store information identifying a trigger frequency associated with the particular process. Process dependencies field 622 may store information identifying other processes that depend on the particular process. The information stored in latency requirements field 616, resource requirements field 618, trigger frequency field 620, and/or process dependencies field 622 may be used to determine whether the particular process should be an on-demand process or an always-on process. As an example, if the particular process requires a low latency (e.g., lower than a latency threshold), the particular process may be designated as an always-on process. As another example, if the particular process does not require a low latency, and/or the trigger frequency associated with the particular process is low (e.g., below a frequency threshold), the particular process may be designated as an on-demand process. As yet another example, if the particular process does not require a low latency, and/or the resource requirements associated with the particular process are high (e.g., above a resource requirement threshold), the particular process may be designated as an on-demand process. As yet another example, if a process designated as an always-on process depends on the particular process (e.g., is activated in response to the particular process being activated), the particular process may be designated as an always-on process.

On-demand field 624 may include information identifying whether the particular process has been designated as an on-demand process. In some implementation, whether the particular process is designated as an on-demand process or an always-on process may depend on other parameters. As an example, the particular process may be designated as an on-demand process during particular time periods (e.g., during off-peak hours, when network load is below a load threshold, etc.) and may be designated as an always-on process during other time periods. As another example, the particular process may be designated as an on-demand process based on a particular network state (e.g., access network 120 includes a particular number of active function nodes and/or processes of a particular type in a particular geographic area, etc.) and may be designated as an always-on process based on other network states.

Although FIG. 6A shows exemplary components of processes DB 540, in other implementations, processes DB 540 may include fewer components, different components, additional components, or differently arranged components than depicted in FIG. 6A.

Figure 6B:
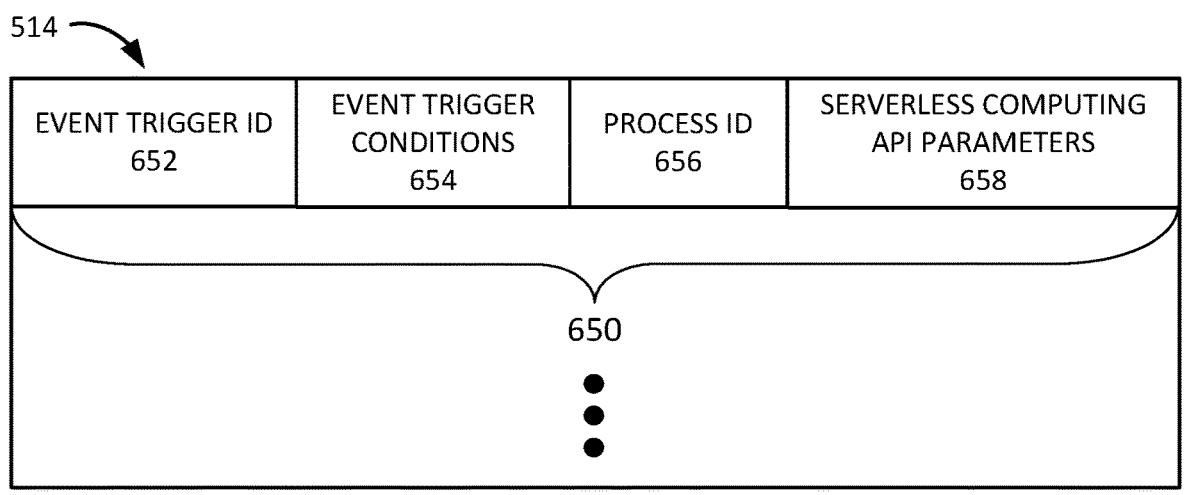
FIG. 6B is a diagram illustrating exemplary components of the event trigger database of FIG. 5B.

FIG. 6B is a diagram illustrating exemplary components of event trigger DB 514. As shown in FIG. 6B, event trigger DB 514 may include one or more event trigger records 650. Each event trigger record 650 may store information relating to a particular event trigger condition for a particular on-demand process associated with VNF MO 422. Event trigger record 650 may include an event trigger ID field 652, an event trigger conditions field 654, a process ID field 656, and a serverless computing API parameters field 658.

Event trigger ID field 652 may include an ID that uniquely identifies a particular trigger condition. Event trigger conditions field 654 may include information identifying one or more conditions associated with the particular trigger condition. For example, even trigger conditions field 654 may identify a particular type of request from UE device 110, a particular type of request from another 5G function node, a particular type of request from an on-demand process associated with VNF MO 422 or another 5G function node, a particular type of network state, a particular time period, and/or another type of trigger condition. Process ID field 656 may identify a particular on-demand process in processes DB 540 associated with the particular trigger condition. Serverless computing API parameters field 658 may store a set of parameters to be used in activating the on-demand process associated with the particular trigger condition in serverless computing system 160.

Although FIG. 6B shows exemplary components of event trigger DB 514, in other implementations, event trigger DB 514 may include fewer components, different components, additional components, or differently arranged components than depicted in FIG. 6B.

Figure 7:
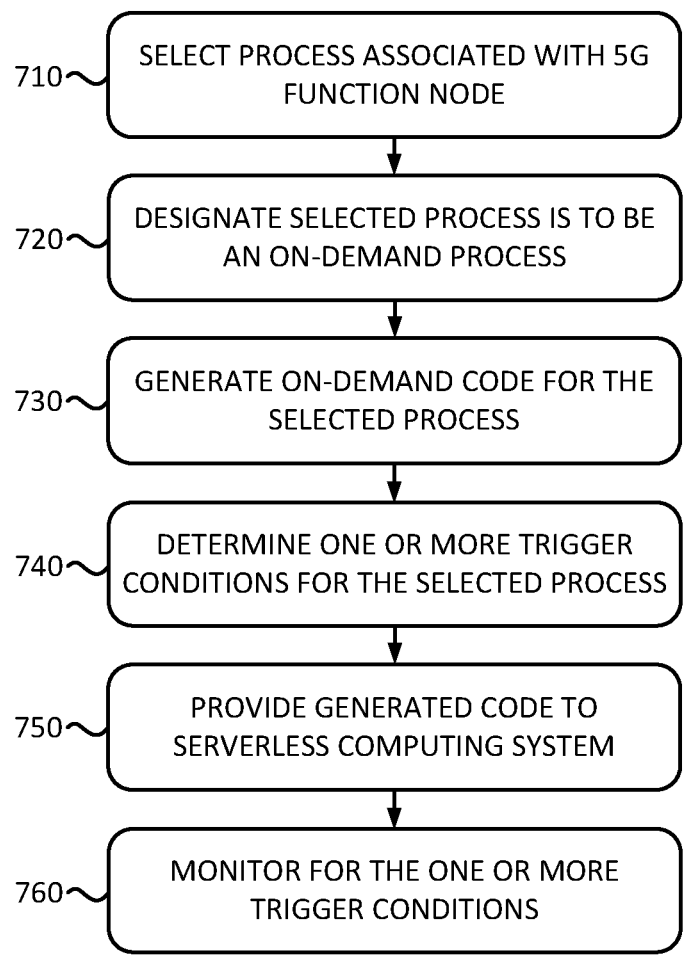
FIG. 7 is a flowchart of a process for generating code for an on-demand process for a function node according to an implementation described herein.

FIG. 7 is a flowchart of a process for generating code for an on-demand process for a function node according to an implementation described herein. In some implementations, the process of FIG. 7 may be performed by cloud computing system 150. In other implementations, some or all of the process of FIG. 7 may be performed by another device or a group of devices separate from cloud computing system 150, such as one or more components of access network 120.

The process of FIG. 7 may include selecting a process associated with a 5G function node (block 710), determining that the selected process is to be an on-demand process (block 720), and generating on-demand code for the selected process (block 730). For example, serverless computing manager 465 may select a 5G function node of a particular type to instantiate as a VNF MO 422, may select a process associated with the selected 5G function node (e.g., a process record 600 in processes DB 540), and may designate the process to be an on-demand process based on one or more of a latency requirement associated with the selected process, a resource requirement associated with the selected process, a trigger frequency associated with the selected process, a process dependency associated with the selected process, and/or another parameter associated with the selected process.

As an example, a process that does not have a latency requirement lower than a latency threshold may be designated to be an on-demand process. As another example, a process that is associated with a resource requirement higher than a resource threshold may be designated to be an on-demand process. As yet another example, a process that is associated with a trigger frequency that is lower than a trigger frequency threshold may be designated to be an on-demand process. As yet another example, a process that does not have an always-on process dependent on the process may be designated as an on-demand process.

The process of FIG. 7 may further include determining one or more trigger conditions for the selected process (block 740), providing the generated code to serverless computing system 160 (block 750), and monitoring for the one or more trigger conditions (block 760). For example, serverless computing manager 465 may select one or more trigger conditions for activating the selected process, such as, for example, a particular type of request from UE device 110, a particular type of request from another 5G function node, a particular type of request from an on-demand process associated with VNF MO 422 or another 5G function node, a particular type of network state, a particular time period, and/or another type of trigger condition. VNF MO 422 may then be configured to monitor for the selected one or more trigger conditions.

As an example, the 5G function node may include AMF 220 with one or more always-on processes that include an interface to communicate with gNodeB 210, SMS transport, session management messages transport between UE device 110 and SMF 240, etc.; and one or more on-demand processes to implement registration management, connection management, reachability management, mobility management, lawful intercepts, access authentication and authorization, location services management, functionality to support non-3GPP access networks, etc.

As another example, the 5G function node may include UPF 230 with one or more always-on processes that include packet routing and forwarding, maintaining an anchor point for intra/inter-RAT mobility, maintaining an external PDU point of interconnect to a data network, performing the user plane part of policy rule enforcement, performing packet inspection, performing QoS handling in the user plane, performing uplink traffic verification, performing transport level packet marking, performing downlink packet buffering, etc.; and one or more on-demand processes to implement lawful intercept, traffic usage reporting, etc.

As yet another example, the 5G function node may include SMF 240 with one or more always-on processes that include interfaces to communicate with AMF 220 and/or UPF 230, etc.; and one or more on-demand processes to implement session establishment, modification, and/or release, perform IP address allocation and management, perform DHCP functions, perform selection and control of UPF 230, configure traffic steering at UPF 230 to guide traffic to the correct destination, terminate interfaces toward PCF 254, perform lawful intercepts, charge data collection, support charging interfaces, control and coordination of charging data collection, termination of session management parts of NAS messages, perform downlink data notification, manage roaming functionality, etc.

As yet another example, the 5G function node may include SMF 240 with one or more always-on processes that include interfaces to communicate with AMF 220 and/or other 5G function nodes, etc.; and/or one or more on-demand processes to implement services associated with a particular application. As yet another example, the 5G function node may include UDM 252 with one or more always-on processes that include interfaces to communicate with AMF 220 and/or other 5G function nodes, etc.; and/or one or more on-demand processes to manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, etc.

As yet another example, the 5G function node may include PCF 254 with one or more always-on processes that include interfaces to communicate with AMF 220 and/or other 5G function nodes, etc.; and/or one or more on-demand processes to control network behavior, provide policy rules to control plane functions, access subscription information relevant to policy decisions, perform policy decisions, etc. As yet another example, the 5G function node may include NRF 256 with one or more always-on processes that include interfaces to communicate with AMF 220 and/or other 5G function nodes, etc.; and/or one or more on-demand processes to support a service discovery function and maintain a profile of available NF instances and their supported services, etc.

As yet another example, the 5G function node may include NEF 258 with one or more always-on processes that include interfaces to communicate with AMF 220 and/or other 5G function nodes, etc.; and/or one or more on-demand processes to expose capabilities and events to other NFs, secure provision of information from external applications to access network 120, translate information between access network 120 and devices/networks external to access network 120, support a PFD function, etc.

As yet another example, the 5G function node may include NSSF 260 with one or more always-on processes that include interfaces to communicate with AMF 220 and/or other 5G function nodes, etc.; and/or one or more on-demand processes to select a set of network slice instances to serve a particular UE device 110, determine NSSAI, determine a particular AMF 220 to serve a particular UE device 110, etc. As yet other example, the 5F function node may include an AUSF function node, an N3IWF function node, a UDR function node, a UDSF function node, an SMSF function node, a 5G-EIR function node, an LMF function node, an SEPP function, and/or another type of 5G function node.

In some implementations, a process associated with a 5G function node may be switched from an on-demand process to an always-on process or from an always-on process to an on-demand process. For example, serverless computing manager 465 may receive a request to change a particular on-demand process to an always-on process, designate the particular on-demand process as an always-on process, in response to receiving the request, and activate the particular on-demand process as an always-on process. Similarly, serverless computing manager 465 may receive a request to change a particular always-on process to an on-demand process, designate the particular always-on process as an on-demand process, in response to receiving the request, generate on-demand code for the designating on-demand process, provide the generated on-demand code to serverless computing system 160, select an on-demand trigger condition for the designated on-demand process, and monitor for the selected on-demand trigger condition.

Figure 8:
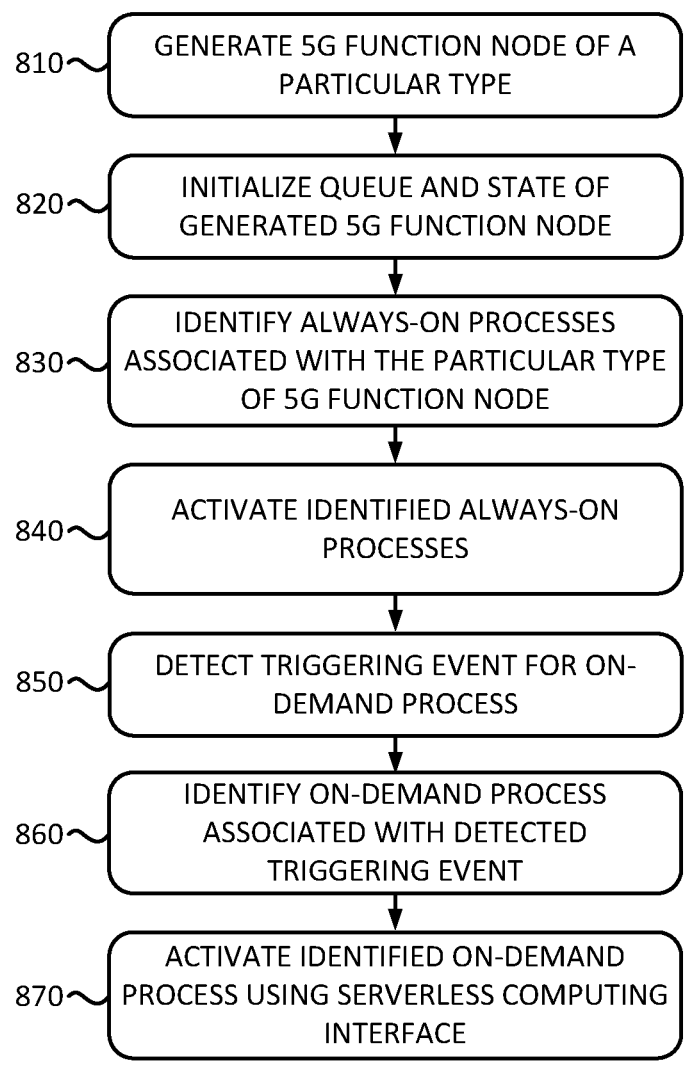
FIG. 8 is a flowchart of a process for managing serverless computing for a function node according to an implementation described herein.

FIG. 8 is a flowchart of a process for managing serverless computing for a function node according to an implementation described herein. In some implementations, the process of FIG. 8 may be performed by cloud computing system 150. In other implementations, some or all of the process of FIG. 8 may be performed by another device or a group of devices separate from cloud computing system 150, such as one or more components of access network 120.

The process of FIG. 8 may include generating a 5G function node of a particular type (block 810), initializing a queue and state of the generated 5G function node (block 820), identifying always-on processes associated with the particular type of 5G function node (block 830), and activating the identified always-on processes (block 840). For example, VNF manager 460 may instantiate VNF MO 422 for a particular type of 5G network node, activate AOPs 550 associated with the particular type of 5G node, initialize request queue DB 520 and state DB 530, and activate event trigger detector 512.

The process of FIG. 8 may further include detecting a triggering event for an on-demand process associated with the generated 5G function node (block 850), identifying an on-demand process associated with the detected triggering event (block 860), and activating the identified on-demand process using a serverless computing interface (block 870).

For example, event trigger detector 512 may determine that a request from UE device 110 in request queue DB 520 corresponds to a type of request that is associated with an event trigger condition in event trigger DB 514. In response, event trigger detector 512 may activate an on-demand process associated with the event trigger condition by sending a request to serverless computing system 160 via serverless computing interface 516 to activate the on-demand process.

Figure 9:
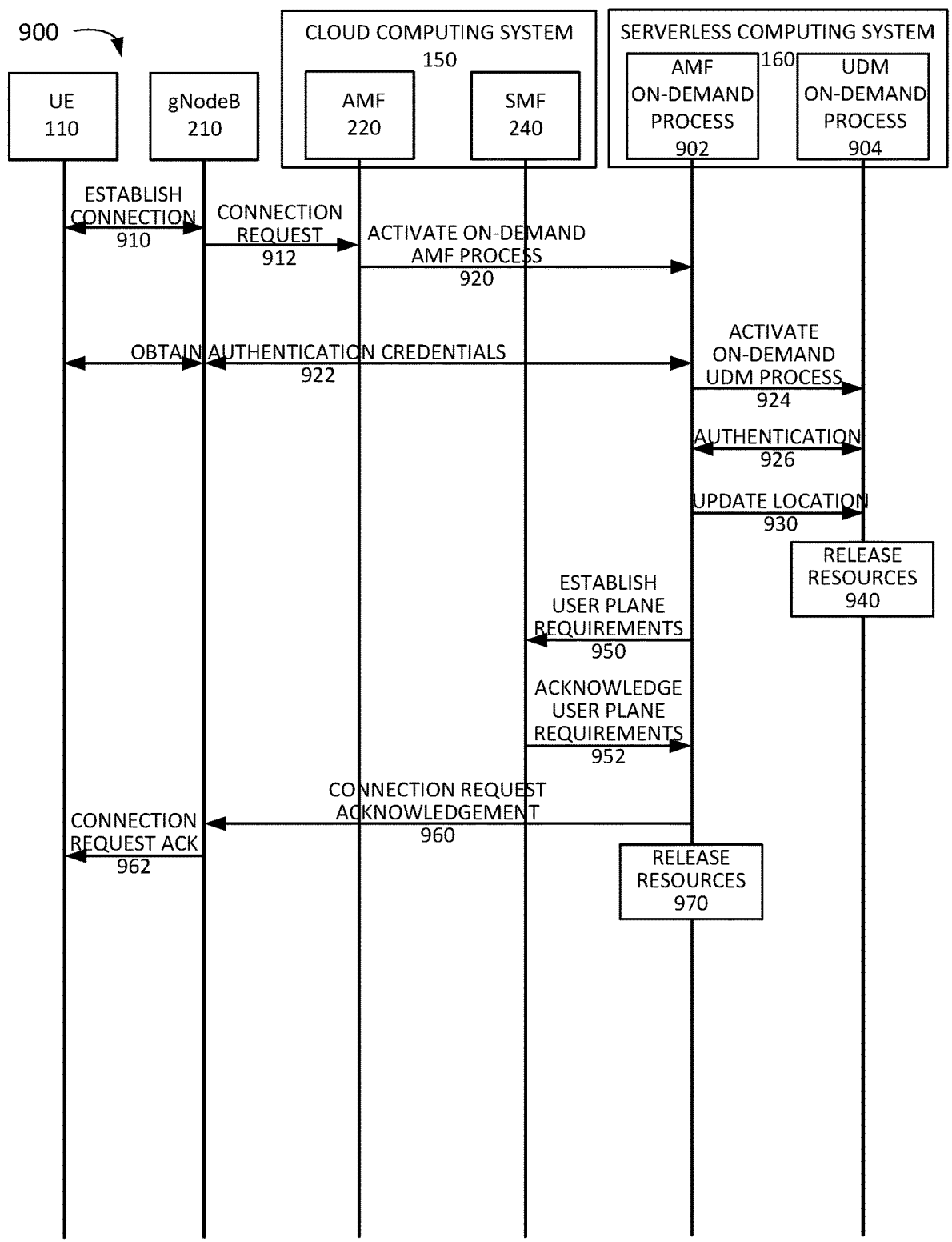
FIG. 9 is an exemplary signal flow of performing an authentication process using serverless computing according to an implementation described herein.

FIG. 9 is an exemplary signal flow 900 of performing an authentication process using serverless computing according to an implementation described herein. As shown in FIG. 9, signal flow 900 may include UE device 110 establishing a radio link connection with gNodeB 210 (signal 910). gNodeB 210 may send a connection request to AMF 220 (signal 912), which may be implemented as a VNF MO 422 in cloud computing system 150. AMF 220 may determine that that UE device 110 needs to be authenticated and may generate an authentication request and place the authentication request in request queue DB 520. When the request is processed, AMF 220 may determine that the authentication request is to be processed using an authentication process and that the authentication process is an on-demand process. In response, AMF 220 may activate AMF on-demand process 902 to perform the authentication, using serverless computing interface 516, by sending an event trigger notification to serverless computing system 160 (signal 920).

Upon receipt of the event trigger notification, serverless computing system 160 may load and execute code for AMF on-demand process 902. AMF on-demand process 902 may then obtain authentication credentials from UE device 110 via gNodeB 210 (signal 922). AMF on-demand process 902 may then trigger another on-demand process, a UDM on-demand process 904 associated with UDM 252 (signal 924), as UDM 252 may include the authentication verification information associated with UE device 110, and may authenticate UE device 110 with the UDM on-demand process 904 (signal 926). Furthermore, AMF on-demand process 902 may update the location of UE device 110 in the record associated with UE device 110 maintained by UDM by sending an update location message to UDM on-demand process 904 (signal 930). After updating the location of UE device 110, UDM on-demand process 904 may finish executing and the resources associated with UDM on-demand process 904 may be released by serverless computing system 160 (block 940).

AMF on-demand process 902 may then send an establish user plane requirements message, associated with the connection requested by UE device 110, to SMF 240, implemented as another VNF MO 422 in cloud computing system 150 (signal 950). SMF 240 may respond with an acknowledgement message that the user plane requirements were received and established (signal 952). AMF on-demand process 902 may then send a connection request acknowledgement message to UE device 110 via gNodeB 210 (signals 960 and 962), indicating that the requested connection has been established. After determining that the processing of the connection request has been completed, AMF on-demand process 902 may finish executing and the resources associated with AMF on-demand process 902 may be released by serverless computing system 160 (block 970).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 7 and 8, and series of signal flows have been described with respect to FIG. 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   initializing, by a computer device, a Fifth Generation (5G) function node of a particular type;
   identifying, by the computer device, one or more always-on processes associated with the particular type of 5G function node;
   activating, by the computer device, the identified one or more always-on processes;
   designating, by the computer device, a process to be performed by the 5G function node as an on-demand process based on one or more criteria, wherein the one or more criteria comprise a latency requirement and wherein the on-demand process is associated with code that is loaded and executed in response to a trigger condition of one or more trigger conditions;
   monitoring, by the computer device, the one or more trigger conditions associated with the 5G function node;
   detecting, by the computer device, the trigger condition, of the one or more trigger conditions;
   identifying, by the computer device, that the designated on-demand process is to be performed by the 5G function node based on the detected trigger condition; and
   activating, by the computer device, the designated on-demand process in a serverless computing system using a serverless computing interface, in response to detecting the trigger condition.

2. The method of claim 1, further comprising:
   generating code for the designated process; and
   providing the generated code to the serverless computing system.

3. The method of claim 2, wherein the one or more criteria further include at least one of:
   a resource requirement associated with the selected process,
   a trigger frequency associated with the selected process, or
   a process dependency associated with the selected process.

4. The method of claim 1, wherein the 5G function node includes:
   a gNodeB node,
   an Access and Mobility Management Function (AMF) node,
   a Unified Data Management (UDM) node,
   a Session Management Function (SMF) node,
   a User Plane Function (UPF) node,
   an Application Function (AF) node,
   a Policy Control Function (PCF) node,
   a Network Exposure Function (NEF) node,
   a Network Repository Function (NRF) node, or
   a Network Slice Selection Function (NSSF) node.

5. The method of claim 1, wherein identifying the one or more always-on processes associated with the particular type of 5G function node includes:
   determining that a particular process, associated with the particular type of 5G function node, is associated with a latency requirement that is lower than a latency threshold; and
   designating the particular process as an always-on process based on determining that the particular process is associated with the latency requirement that is lower than the latency threshold.

6. The method of claim 1, wherein the trigger condition further includes at least one of:
   receiving a request from a user equipment (UE) device;
   receiving a request from another 5G function node;
   receiving a request from a process associated with the 5G function node;

detecting a particular network state associated with the on-demand process; or detecting a particular time period associated with the on-demand process.

7. The method of claim 1, further comprising:

receiving a request to change a particular on-demand process, associated with the particular type of 5G function node, to an always-on process;

designating the particular on-demand process as an always-on process, in response to receiving the request; and activating the particular on-demand process as an always-on process.

8. The method of claim 1, further comprising:

receiving a request to change a particular always-on process, associated with the particular type of 5G function node, to an on-demand process;

designating the particular always-on process as a different on-demand process, in response to receiving the request;

generating on-demand code for the designated different on-demand process;

providing the generated on-demand code to the serverless computing system;

selecting an on-demand trigger condition for the designated different on-demand process; and monitoring for the selected on-demand trigger condition.

9. The method of claim 1, further comprising:

maintaining a request queue and a state for the 5G function node.

10. The method of claim 1, wherein the designated on-demand process associated with the 5G function node includes at least one of:

a user equipment (UE) device registration process, an Internet Protocol (IP) Multimedia Subsystem (IMS) registration process, a UE device authentication process, a UE device group management process, a charging process, an IP address allocation process, a packet filtering configuration process, a Quality of Service (QoS) mapping process, a session management process, or a network slice management process.

11. A computer device comprising:

a memory configured to store instructions; and a processor configured to execute the instructions to:

initialize a Fifth Generation (5G) function node of a particular type;

identify one or more always-on processes associated with the particular type of 5G function node;

activate the identified one or more always-on processes;

designate a process to be performed by the 5G function node as an on-demand process based on one or more criteria, wherein the one or more criteria include a latency requirement; and wherein the on-demand process is associated with code that is loaded and executed in response to a trigger condition of one or more trigger conditions;

monitor the one or more trigger conditions associated with the 5G function node;

detect the trigger condition, of the one or more trigger conditions;

identify that the designated on-demand process is to be performed by the 5G function node based on the detected trigger condition; and activate the designated on-demand process in a serverless computing system using a serverless computing interface, in response to detecting the trigger condition.

12. The computer device of claim 11, wherein the processor is further configured to:

generate code for the designated process; and provide the generated code to the serverless computing system.

13. The computer device of claim 12, wherein the one or more criteria further include at least one of:

a resource requirement associated with the selected process, a trigger frequency associated with the selected process, or a process dependency associated with the selected process.

14. The computer device of claim 11, wherein the 5G function node includes:

a gNodeB node, an Access and Mobility Management Function (AMF) node, a Unified Data Management (UDM) node, a Session Management Function (SMF) node, a User Plane Function (UPF) node, an Application Function (AF) node, a Policy Control Function (PCF) node, a Network Exposure Function (NEF) node, a Network Repository Function (NRF) node, or a Network Slice Selection Function (NSSF) node.

15. The computer device of claim 11, wherein, when identifying the one or more always-on processes associated with the particular type of 5G function node, the processor is further configured to:

determine that a particular process, associated with the particular type of 5G function node, is associated with a latency requirement that is lower than a latency threshold; and designate the particular process as an always-on process based on determining that the particular process is associated with the latency requirement that is lower than the latency threshold.

16. The computer device of claim 11, wherein the trigger condition further includes at least one of:

receiving a request from a user equipment (UE) device;

receiving a request from another 5G function node;

receiving a request from a process associated with the 5G function node;

detecting a particular network state associated with the on-demand process; or detecting a particular time period associated with the on-demand process.

17. The computer device of claim 11, wherein the processor is further configured to:

receive a request to change a particular on-demand process, associated with the particular type of 5G function node, to an always-on process;

designate the particular on-demand process as an always-on process, in response to receiving the request; and activate the particular on-demand process as an always-on process.

18. The computer device of claim 11, wherein the processor is further configured to:

receive a request to change a particular always-on process, associated with the particular type of 5G function node, to an on-demand process;

designate the particular always-on process as a different on-demand process, in response to receiving the request;

generate on-demand code for the designated different on-demand process;

provide the generated on-demand code to the serverless computing system;

select an on-demand trigger condition for the designated different on-demand process; and monitoring for the selected on-demand trigger condition.

19. The computer device of claim 11, wherein the designated on-demand process associated with the 5G function node includes at least one of:

a user equipment (UE) device registration process, an Internet Protocol (IP) Multimedia Subsystem (IMS) registration process, a UE device authentication process, a UE device group management process, a charging process, an IP address allocation process, a packet filtering configuration process, a Quality of Service (QoS) mapping process, a session management process, or a network slice management process.

20. A non-transitory computer-readable memory device storing instructions executable by a processor, the non-transitory computer-readable memory device comprising:

one or more instructions to initialize a Fifth Generation (5G) function node of a particular type;

one or more instructions to identify one or more always-on processes associated with the particular type of 5G function node;

one or more instructions to activate the identified one or more always-on processes;

one or more instructions to designate a process to be performed by the 5G function node as an on-demand process based on one or more criteria, wherein the one or more criteria include a latency requirement and wherein the on-demand process is associated with code that is loaded and executed in response to a trigger condition of one or more trigger conditions;

one or more instructions to monitor the one or more trigger conditions associated with the 5G function node;

one or more instructions to detect the trigger condition, of the one or more trigger conditions;

one or more instructions to identify that the designated on-demand process is to be performed by the 5G function node based on the detected trigger condition; and one or more instructions to activate the designated on-demand process in a serverless computing system using a serverless computing interface, in response to detecting the trigger condition.

* * * * *